Sept. 1, 1959  E. WOYDT  2,901,921
INFINITELY VARIABLE HYDROSTATIC GEARS
Filed Oct. 1, 1956  4 Sheets-Sheet 2

INVENTOR
E. Woydt
ATTYS.

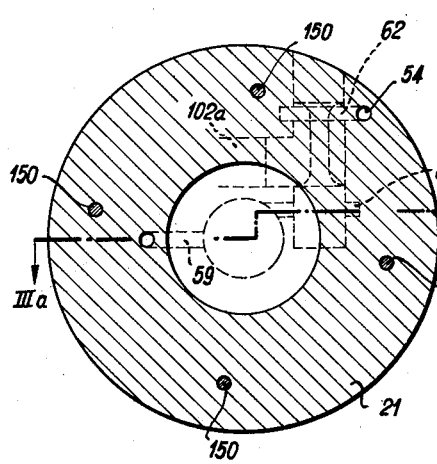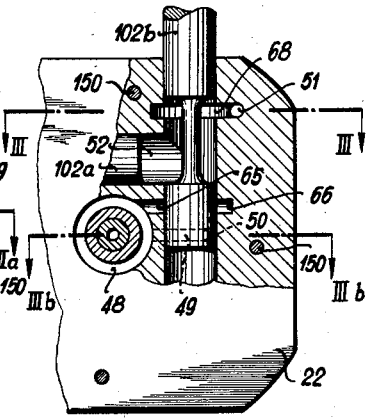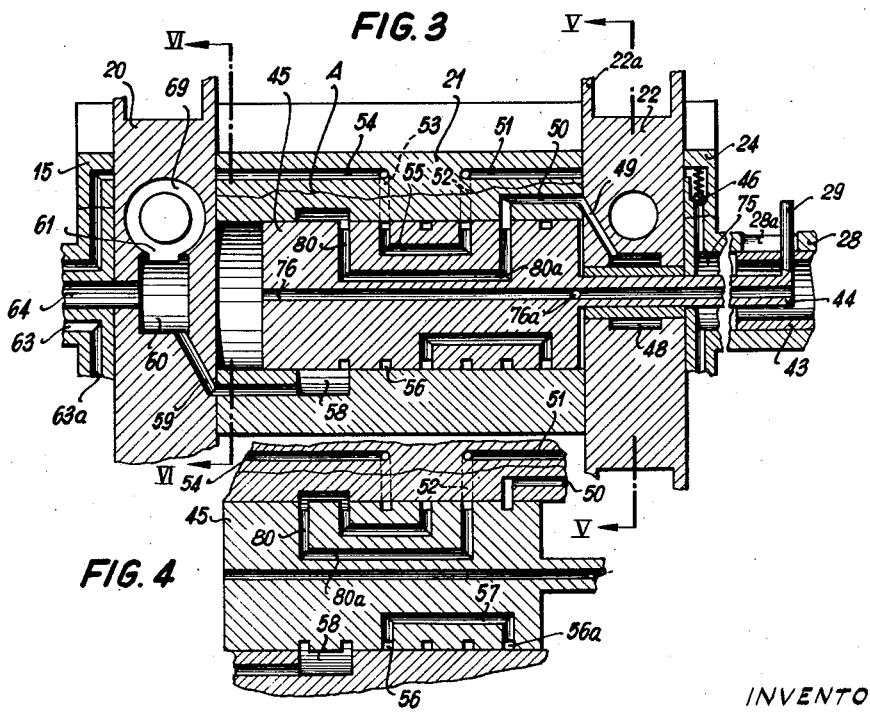

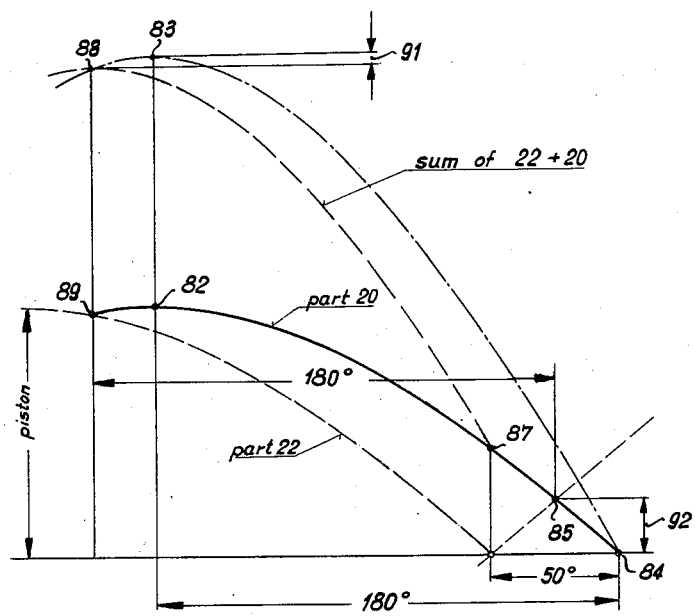

United States Patent Office 2,901,921
Patented Sept. 1, 1959

2,901,921

INFINITELY VARIABLE HYDROSTATIC GEARS

Eduard Woydt, Stuttgart, Germany

Application October 1, 1956, Serial No. 613,027

4 Claims. (Cl. 74—677)

This invention relates to an infinitely variable hydrostatic gear with a driving shaft driving the adjustable pump and a driven shaft driven by the adjustable engine.

The invention has for its object to create a hydrostatic gear which is as small as possible and attains the best possible efficiency. The gear is intended mainly for vehicles and must therefore not be substantially larger than the usual toothed wheel gears and must reach an efficiency which is as near as possible equal to that of this gear.

The invention consists in this, that both in the pump and the engine the cylinders or their pistons operate on crankshafts, eccentric shafts, swash plates or the like rotating at an adjustable speed of revolution. As the crankshafts, owing to their adjustability, can rotate at any speed, it is possible to keep the requisite stroke volume of the pump and the engine very small, so that a small overall height of the gear becomes possible.

In the two extreme positions of such a gear the hydraulic energy may become equal to zero, so that in top gear, for instance, no hydraulic energy at all has to be developed.

Hence, in the last-named case the quantity to be conveyed by the engine must become equal to zero. This result cannot be attained in a practically useful manner with the hitherto known means, as at the smallest stroke the mechanical efficiency becomes too bad and even self-locking may occur. In the other extreme position the engine, the cylinders and crankshafts of which operate on the geared-down drive, rotate with the differential speed of revolution zero. In order to attain this, the stroke volume of the engine would have to be made so great that the gear would become practically useless, for, shortly before the extreme position at the lowest speed of revolution, a hydraulic energy would have to be transmitted, which, corresponding to the low speed of revolution, can only be transmitted with a very great stroke volume.

The further development of the invention makes possible the complete attainment of one extreme position, namely of top gear, through the engine and/or the pump being divided up into two or more part engine or part pump units offset with respect to one another, of which during a gear change one reaches its full stroke before the other or others, and that part unit which reaches the zero stroke first being capable of being changed over at this moment from working as an engine to working as a pump (or vice versa).

To obtain the other extreme position, without having to use inadmissibly great stroke volumes, the crankshafts or the like coacting with the piston of the engine are driven mechanically at a speed of revolution which is somewhat lower than that corresponding to the greatest reduction.

The invention makes it possible, through the expedient that it keeps the power to be transmitted hydraulically small in relation to the total power to be transmitted, to use a gear according to the German patent application W 17 168:59a (WXX) the U.S. patent application Ser. No. 589,161 or the British patent application 14,367/56. According to the invention the dimensions of the gear can be kept so small as to be constructionally possible at the speeds of revolution common with vehicles, more particularly as regards the centrifugal forces.

The combination of a hydraulic drive with a mechanical stepped gear placed after it is known per se and has for its object to multiply the range of speeds of revolution which can be controlled with the infinitely variable hydraulic gear. The hydraulic gear according to the invention can be adapted to such use through expedients forming a further development of the idea underlying the present invention.

The drawings illustrate the invention, in which:

Figure 1 shows a general view of a gear according to the invention, the control parts of the hydraulic gear and the mechanical stepped control gear being shown partly in section. The middle part of the hydraulic gear, broken away in Figure 1, is illustrated by Figure 3 which shows a section of this omitted middle part. Figure 1 itself shows in its lower part a section along I—Ia of Figure 2 and in its upper part a section along I—Ib of Figure 2.

Figure 2 shows a section along II—II of Figure 1 and

Figure 3 the middle part of the hydraulic gear according to Figure 1 in section, the section being laid through the part 20 on line IIIa—IIIa of Figure 6 and the section through the part 22 on the line IIIb—IIIb of Figure 5. The part 21, in so far as it lies in Figure 3 below the section line A, is also cut along IIIb—IIIb, whilst above the section line it is cut along line III—III.

Figure 4 shows another position of the displaceable piston 45 of Figure 3.

Figure 5 shows a partially broken away section on line V—V of Figure 3.

Figure 6 a section on line VI—VI of Figure 3 and

Figure 7 a graphic illustration.

Figure 1:
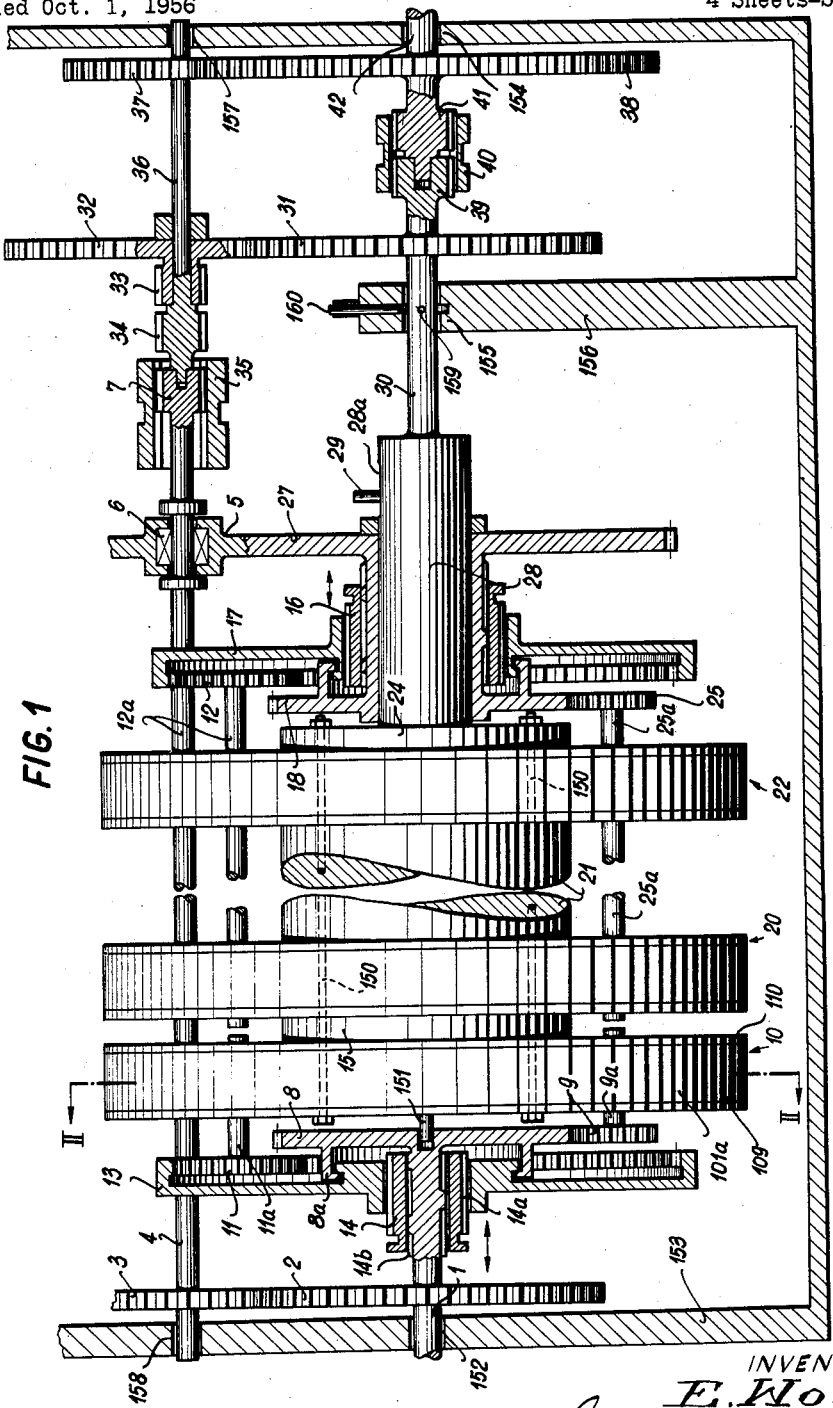

In Figure 1 the driving shaft 1 carries a toothed wheel 8, and also a toothed wheel 2 which meshes with the toothed wheel 3 of the by-pass shaft 4, whilst the toothed wheel 8 meshes with the two toothed wheels 9 of two crankshafts 9a of the fluid pump 10. The construction of the fluid pump 10 is to be seen from the section according to Figure 2 and corresponds substantially to Figure 3 of the German patent application W 17 168 Ia/59a of July 25, 1955, or the U.S. patent application Ser. No. 589,161 or the British application 14,367 of 1956. An internally toothed gear wheel 13 is prevented from longitudinal displacement with respect to the toothed wheel 8 by means of an annular groove guide 8a or the like. It is mounted on a sleeve 14 having longitudinal grooves 14a parallel to the axis, so that the sleeve 14 is displaceable in the axial direction with respect to the toothed wheel 13. The sleeve 14 itself is mounted on the shaft 1 with helical grooves 14b on corresponding helical ribs of the shaft 1, so that, by displacing the sleeve 14, the angular position of the two gear wheels 8 and 13 with respect to one another can be displaced. Meshing with the internally toothed wheel 13 are two pinions 11 which are mounted on eccentric shafts 11a of the fluid pump 10. The fluid pump 10 is connected by a connecting piece 15, in which are suction and pressure ducts 63, 64 (see Figure 3), with the oil motor which has two part units 20 and 22, which each for themselves about equal the oil pump 10 and are connected by a middle part 21. The form of this middle part which serves the purpose of converting one of the two part units from engine operation to pump operation, will be later described with reference to Figures 3 to 6. The arrangement of the gear wheel 18 which is mounted non-slidably on the driven shaft 28 of the hydraulic gear corresponds, roughly to the gear wheel 8, the axially displaceable sleeve 16 to the sleeve 14 and the internally toothed wheel 17 to the wheel 13. The sleeve 16 thus serves the purpose of the relative angular displacement of the wheels 17 and 18.

Figure 2:
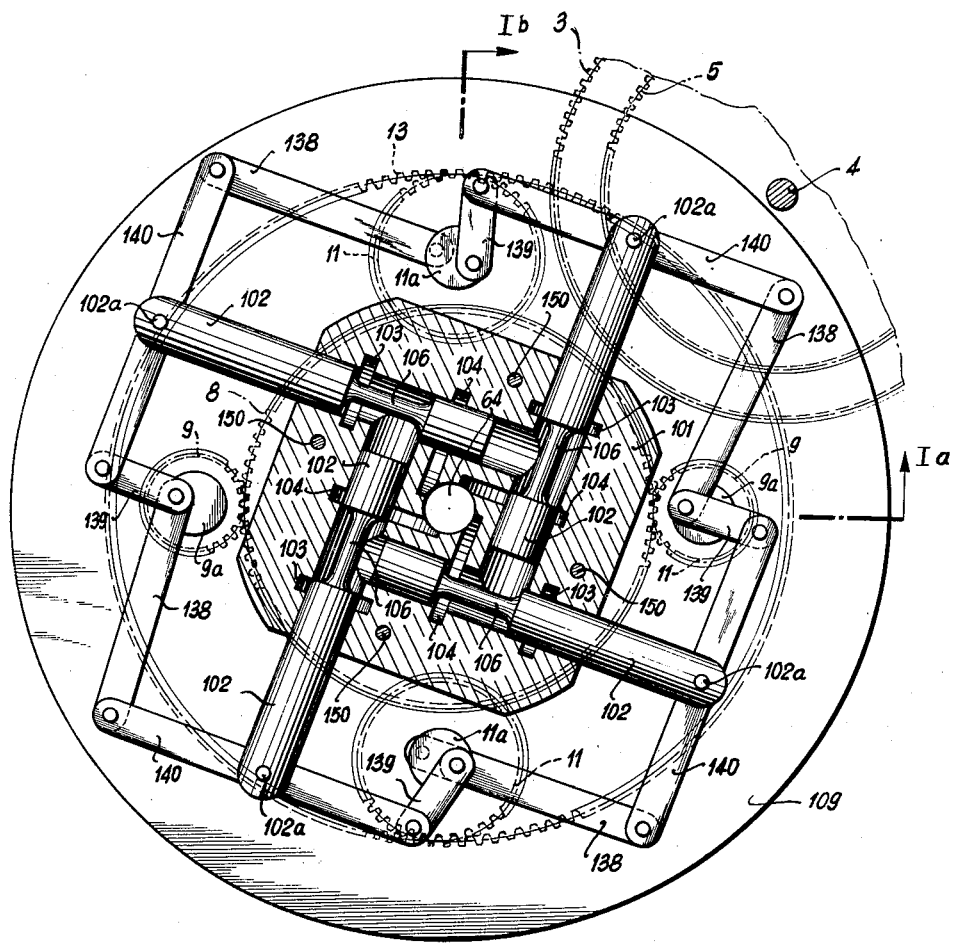

On the by-pass shaft 4, the true position of which in space can be seen in Figure 2, there is mounted on a free-wheel or overtaking coupling 6 a gear wheel 5, the actual size and position of which may be seen from Figure 2. It meshes with the gear wheel 27. The ratio of the two gear wheels 27 to 5 is somewhat greater than the ratio of the two gear wheels 38 to 37, which are disposed at the right hand end of the mechanical stepped gear. The gear wheel 27 is non-slidable on the shaft 28, as it has a common hub with the gear wheel 18. The latter meshes with two pinions 25 which are mounted on the crankshafts 25a of the two pump units 20 and 22. Offset by 90° with respect to the pinions 25 and the crankshafts 25a are two further crankshafts 12a with pinions 12 which mesh with the internally toothed wheel 17. The hydraulic motor unit 20 is rigidly connected with the engine unit 22 by the intermediate piece 21, but the dead centres of the four cranks in the part 20, which correspond to the cranks 9b or 11b in the pump part 10 according to Figure 2, are shifted with respect to the dead centres of the four cranks in the part 22, namely through 50°, when with the aid of the sleeve 16 maximum piston stroke is set in the part units 20 and 22.

The extension 30 of the shaft 28 which by way of the part 24 is rigidly connected with the cylinder block of the engine unit 22 carries a gear wheel 31 which meshes with a gear wheel 32 of the same size and a coupling body 39, over which a coupling sleeve 40 is slid. The latter is mounted so as to be longitudinally displaceable but non-rotatable on the driven shaft 42 which carries the gear wheel 38 meshing with the gear wheel 37 which is mounted on an extension 36 of the by-pass shaft 4. On the right-hand end of the by-pass shaft 4 is mounted a coupling body 7, over which a coupling sleeve 35 is slid. The coupling sleeve 35 can be slid over a coupling body 34 which is fixed on the shaft 36, so as to connect the coupling body 7 with the shaft 36 in a non-rotatable manner. On the sleeve 35 being pushed further to the right, it connects the shaft 36 by way of the coupling body 34 with a coupling body 33 which is fixed on the hub of the gear wheel 32. On the sleeve 35 being pushed quite to the right, it will connect only the parts 34 and 33. The parts 10, 15, 20, 21, 22 and the part 24 to be described later are connected by belts 150 to form a rigid unit, to which are also rigidly connected the shafts 28 and 30 and the axial journal 151. The latter carries the gear wheel 8, the shaft 1 of which is journalled at 152 in a casing 153. The shaft 42 is supported at 154 in the casing 153, whilst the shaft 30 is supported at 155 in the casing part 156. Any further supports that may be required can be provided in a suitable manner not shown in the drawing. The shaft 36 is rotatably supported at 157 and the shaft 4 at 158 in the casing. The parts 10, 15, 20, 21, 22, 24, 28 and 30 rotate in common and form a rigid unit.

Figure 2 shows the construction of the pump 10. The two engine units 20 and 22 correspond substantially to the pump 10, so that their construction is also explained in the description of the pump. Figure 2 illustrates more particularly the true position of the pinions 9 and 11, and of their eccentric shafts 9a and 11a, showing the cranks 9b and 11b mounted on them in their correct position. There is also shown in Figure 2 the true position of the by-pass shaft 4 with the gear wheels 3 and 5. The substantially square cylinder block 101 has four cylinder bores, in which four pistons 102 move. These pistons control with their neck 106, as in German patent specification W 13,787 Ia/59a, or U.S. patent application Ser. No. 500,258 or British patent application No. 8,134 of 1955, inlet ducts 103 and outlet ducts 104. The outlet ducts 104 open into a common outlet duct 64 leading to the engine, whilst the inlet ducts 103 open into a common inlet ring canal 63. In the two disc-shaped added pieces 109 and 110 of the cylinder block 101 (Figure 2), which correspond to those (22a in Figure 3) of the engine part units, are supported two once cranked crankshafts 9a and two double cranked crankshafts 11a. (In Figure 1 the cylinder block 101 with the gear parts on it is covered by a cylindrical cover sheet 101a which connects the disc-shaped added pieces 109 and 110.) On the crankshafts 9a are supported the pinions 9 which mesh with the gear wheel 8 and on the eccentric shaft 11a are supported the pinions 11 which mesh with the internally toothed wheel 13 (see Figure 1). Connecting rods 138 and 139 of the cranks 9b and 11b respectively engage at a common rocking member 140 which is pivotally mounted at 102a on the piston 102. Through relative adjustment of the cranks 9b and 11b the piston stroke can therefore be altered. A detailed description of the pump is unnecessary, as it has already been described in detail in German Patent 942,672 (U.S. patent application Ser. No. 500,252, now Patent 2,769,295, and British patent application 8,134 of 1955).

As will be seen from Figure 5, the piston 102a is controlled by the piston 102b. The annular suction duct 63 coming from the pump 10 is connected by bores 63a and 54 with the annular space 62 (Figure 6). From there the bore 54 leads on into the part 21. Through the downwardly inclined bore 53 leading to the displaceable piston 45, the angular duct 56 and the bore 55 of the displaceable piston 45 the connection to the upwardly inclined bore 52 (Figures 3 and 5) is established. From there a connection is established through the bore 51 to the annular space 68 in the part 22 (Figure 5). From the annular space 66 (Figure 5) of the piston 102b a bore 65 leads into the annular pressure space 48 and thence a further bore 49 into the bore 50 of the displaceable piston 45 in the part 21. Through the bores 80 and 80a, the annular space 58 and the bore 59 a connection with the pressure space 60 is established. The latter is connected on the one hand at 61 with the annular pressure space 69 of the piston 102b and on the other hand by the central bore 64 (Figure 3) with the pump 10. The suction duct 51 continues past the annular suction space 68 (Figure 6) into the part 24 (Figure 3), where a spring-loaded non-return valve 46 shuts it off from the inflow space 75. The neck 44 of the displaceable piston 45 carries a displacing pin 29 extending through a slot 28a of the shaft 28, by means of which the displaceable piston 45 is axially slidable. The space 75 is permanently shut off from the outside by a sleeve 43 fixed to the pin 29. For the purpose of equalising the pressure on the end faces of the displaceable piston 45 there extends through it a central longitudinal bore 76 and through 44 a transverse bore 76a.

The supply of fresh oil takes place through a bore 159 in the shaft 30, which is located inside the bearing 155. Into the bearing 155 opens a pipe 160 which receives oil from an oil container. As soon as, owing to leakage loss in the system a subpressure occurs, the non-return valve 46 will open, so that oil will flow in.

In Figure 4 the displaceable piston 45 is shown in the other extreme position to that of Figure 3. In this position the pressure spaces 69 and 60 of the part 20 are connected by way of the bore 59, the annular space 58, the bores 80 and 80a, the bore 52 and the longitudinal bore 51 with the annular suction space 68 of the part 22, the non-return valve 46 preventing an escape of the pressure into the suction space 75. At the same time the suction space 62 of the part 20 (Figure 6) is connected through the bore 54, the bore 53, the annular space 56, the bore 57, the annular space 56a, the bore 50 and the bore 49 with the pressure space 48 and by way of the bore 65 (Figure 5) with the pressure space 66 of the part 22. Thus, by displacing the displaceable piston 45 the engine part unit 22 can be changed over from engine action to pump action. Figure 7 illustrates the mode of operation of the gear, which is brought about by changing over the engine part unit 22 to pump action. The curve 82, 87, 84 represents the change of the course of a piston of the engine at change of stroke over the displacement angle. The displacement angle is plotted as abscissa. It exactly follows a sign curve. If the cranks of the crankshafts 25a in the part 20 were not displaced by 50° with respect to the corresponding cranks of the crankshafts in the part 22, the stroke volume of the entire engine would amount to the sum of the two engine part units, which is presented by the curve 83, 84. Owing to the rotational displacement through 50°, the effects of the two part engine units will add up in accordance with the curve 88, 87. Hence, the sum in the point 88 is less by the amount 91 than the sum in the point 83 without turning. This amounts in Figure 7 to about 2.5% of the total quantity conveyed. Now, the curve 89, 86 shows the course of stroke in the engine part unit 22 and the curve 82, 87 the course of stroke in the engine part unit 20. When, on the strokes becoming smaller through the displacement of the sleeve 16 in the engine part unit 22, the stroke becomes equal to zero (point 86 of Figure 7), the stroke in the engine part unit 20 will still correspond to the distance 86, 87. If, at the same time, by the displacement of the displaceable piston 45 the suction and pressure duct of the engine part unit 22 be changed, this part unit will now act as a pump and the stroke in the part unit 22 will now increase again, namely according to the curve 86, 85, on the sleeve being further displaced. At the same time the stroke in the engine part unit 20 will continue to decrease, namely according to the curve 87, 85. The two part units 20 and 22 of the engine together have thus to the outside only in the point 85 the stroke zero, that is the absorption capacity zero, although at that point each part for itself still performs about 20%—compare the distance 92—of its normal stroke. In this way, even with a very small conveyed quantity, a tolerable efficiency is reached and a uniformity of the displacement is obtained.

The mode of operation of the gear will be gathered from the following description:

Let it be assumed that the stroke of the pump 10 is set to the maximum and that of the engine unit 22 to zero. The driven shaft 28 will then run at the same speed of revolution as the driving shaft 1. Thereupon, the stroke of the engine is slightly increased by displacing the sleeve 16 and the stroke of the pump slightly reduced by displacing the sleeve 14. The fluid squeezed out by the pump is then taken in by the engine, so that the latter is driven. As the crankshafts 25a of the engine 20, 22 are now driven, they will bear to the outside by way of the gear wheels 18, 27, 5 and by way of the overtaking coupling 6 against the shaft 4. On the sleeves 14 and 16 being now displaced into their extreme position, so that the pump stroke will reach its minimum and the engine stroke its maximum, the speed of revolution of the driven shaft 42 will sink to such an amount that the gear wheel 37 or its shaft 36, which had up to then run faster than the shaft 4, will rotate synchronously with the shaft 4. The sleeve 35 can then without difficulty be slid over the coupling piece 34. Thereupon the connection of the shaft 30 with the shaft 42 is released by sliding the sleeve 40 to the right. The hydraulic gear is thereby completely disconnected, so that the drive of the driven shaft 42 is now effected only by way of the by-pass shaft 4 and two gear wheels 37 and 38, namely corresponding to the diameter ratio of these two gear wheels, at a lower speed of revolution than that of the shaft 4 or the shaft 1 (the gear wheels 2 and 3 have the same diameter). The pump stroke is now again set to a maximum and the engine stroke to a minimum. This causes the shaft 30 to run at its full speed of revolution, so that it is now possible to couple the gear wheel 32 meshing with the gear wheel 31 easily with the shaft 36 by sliding the sleeve 35 to the right. Thereupon the shaft 36 is uncoupled from the shaft 4 through sliding the sleeve 35 still further to the right. The flow of power will again be by way of the hydraulic gear and through the gear wheels 31, 32, 37 and 38 to the driven shaft 42. Thus, the flow of power has never been interrupted during the whole of the change over and only parts running at the same speed were coupled with one another or uncoupled.

For the further reduction in the speed of revolution of the driven shaft 42 the pump stroke is again brought to its minimum and the engine stroke to its maximum. Through the drive of the engine or its cranks by way of the by-pass shaft 4 a very good efficiency is obtained, even at the greatest reduction of speed, as practically no power has to be hydraulically transmitted.

When the speed of revolution is to be again increased, the pump stroke must be brought to the maximum and the engine stroke to the minimum. In hydrostatic gear of a known kind it is not possible to bring the engine again up to the full speed of revolution, as the efficiency of hydrostatic pumps or engines becomes equal to zero at small strokes.

Through the division of the engine or the pump into two parts according to the invention and the above-described possibility of changing over one part unit (in the constructional example the engine part unit 22) to pump action this problem is solved.

When the connecting part 15 or the shaft 30 has again been brought up to the full driving speed, the shaft 4 is coupled again with the shaft 36 by displacing the sleeve 35 to the left and, through sliding the sleeve 35 still further, the gear wheel 32 uncoupled from the shaft 36. The flow of power will then go entirely through the by-pass shaft 4. Through changing the stroke of pump and engine the speed of revolution of the shaft 30 is thereupon lowered again to such an extent that the shaft 30 will run at the same speed as the shaft 42, so that the two shafts can be coupled without difficulty by means of the sleeve 40. Thereupon the shafts 4 and 36 are uncoupled by sliding the sleeve 35 to the left. The coupling and uncoupling of the transmission gear is thus possible without interruption of the flow of power with the aid of only two couplings, namely by actuating the two sleeves 35 and 40. A further increase in the speed of revolution is brought about by increasing the stroke of the pump and by decreasing the stroke of the engine. For reaching the full working speed of the driven shaft 42 the change over of a part unit of the engine must be carried out again, as described above.

The displacement of the sleeves 14, 16, 35 and 40 and of the displacing bar 29 may be effected in a known manner by means of a controller drum or in any other known manner.

For the better understanding of the fluid gear the fluid circuit in both working positions shall now be summarised.

When the pump stroke is at its maximum and the engine stroke at zero, the gear is fixed, that is to say no oil flows, but it runs under pressure, without however a crankshaft 9a, 25a turning. When both engines are working as such, the pressure oil, squeezed out by the pump, flows through 64 to 60, 58, 80, 80a, 50, 49 and 48 and forces the engine piston forward, at the same time expanding and then flowing through the suction space 68, 51, 52, 55, 53, 54, 62, 63a and 63 in closed circuit back to the pump. When the part 20 works as engine, but the part 22 as pump, pressure oil flows both from the pump 10 through 64 and also from 22 to 60. From the unit 22, in which the piston 102a has what was hitherto its suction space now functioning as pressure space, as the stroke has been changed through zero and the displaceable piston 45 has been displaced, pressure oil will flow by way of 51, 52, 80a, 80, 58 and 59 to 60. After expansion, through the motion of the piston in 20, the oil will flow back again in two streams from 62 through 63a and 64 to 10 and by way of 54, 56, 57, 56a, 50, 49 to 48, that is to say also in closed circuits.

I claim:

1. A continuously variable hydraulic power-transmission system, particularly for vehicles, comprising: a driving shaft, a driven shaft, a pump cylinder block and a motor cylinder block both rigidly connected with the driven shaft, pistons reciprocable in the pump cylinder block, pistons reciprocable in the motor cylinder block, planet pinions journaled on the pump cylinder block, pump crank-shafts driven by the driving shaft and driving the pistons of the pump with variable stroke volume through the said planet pinions, further planet pinions journaled on the motor cylinder block, a by-pass shaft, and motor crank-shafts driven by the driving shaft through the medium of the by-pass shaft and driving the pistons of the motor body with variable stroke volume through the medium of the said further planet pinions.

2. A continuously variable hydraulic power-transmission system as claimed in claim 1, further comprising a free-wheel clutch transmitting motion in one direction from the by-pass shaft to the motor crank-shafts.

3. A continuously variable hydraulic power-transmission system particularly for vehicles, comprising: a driving shaft, a driven shaft, an adjustable pump driven by the driving shaft, an adjustable motor driving the driven shaft, the body of the motor being rigidly connected with the body of pump, one of these two adjustable members including two similar partial aggregates, each incorporating pistons and cylinders, the pistons and cylinders of one partial aggregate being angularly displaced relatively to those of the other, one of these partial aggregates, when the gear is being changed, being adapted to reach its zero stroke before the other, and the same adjustable member also including control members located between the two partial aggregates and formed with ducts capable of acting both as suction ducts and as pressure ducts according to the relative position of the said control members, these control members being adapted to change the action of the ducts from pressure to suction and from suction to pressure whenever the leading partial aggregate reaches its zero stroke.

4. A continuously variable hydraulic power-transmission system as claimed in claim 3, wherein the adjustable motor is a hydraulic piston motor including two partial aggregates and control members, and also including crank-shafts co-operating with its pistons, the hydrostatic gear further comprising: speed-raising means including a by-pass shaft and toothed wheels adapted to transmit power from the driving shaft to the crank-shafts of the adjustable motor at a speed which is somewhat lower than the speed that corresponds to the maximum hydraulic reduction of speed in the hydraulic gear consisting of the adjustable pump and the adjustable motor.

References Cited in the file of this patent

UNITED STATES PATENTS

| 2,222,144 | Ferris | Nov. 19, 1940 |
| 2,618,988 | Woydt | Nov. 25, 1952 |